United States Patent

Goodwin et al.

[11] Patent Number: 5,642,443
[45] Date of Patent: Jun. 24, 1997

[54] WHOLE ORDER ORIENTATION METHOD AND APPARATUS

[75] Inventors: Robert Melvin Goodwin; Joseph Anthony Manico, both of Rochester, N.Y.

[73] Assignee: Eastman Kodak Company, Rochester, N.Y.

[21] Appl. No.: 322,241

[22] Filed: Oct. 12, 1994

[51] Int. Cl.⁶ ................... G06K 9/36; G06K 9/32
[52] U.S. Cl. .............. 382/289; 382/295; 348/581
[58] Field of Search ...................... 382/286, 289, 382/291, 293, 295, 296; 348/580–183

[56] References Cited

U.S. PATENT DOCUMENTS

| | | | |
|---|---|---|---|
| 4,168,488 | 9/1979 | Evans | 340/146.3 |
| 4,642,700 | 2/1987 | Ohta et al. | 358/285 |
| 4,751,660 | 6/1988 | Hedley | 364/518 |
| 4,870,694 | 9/1989 | Takeo | 382/289 |
| 5,038,218 | 8/1991 | Matsumoto | 358/296 |
| 5,077,811 | 12/1991 | Onda | 382/46 |
| 5,133,045 | 7/1992 | Gaither et al. | 395/51 |
| 5,235,651 | 8/1993 | Nafarieh | 382/46 |
| 5,270,831 | 12/1993 | Parulski et al. | 358/403 |
| 5,276,742 | 1/1994 | Dasari et al. | 382/289 |
| 5,515,450 | 5/1996 | Takeo et al. | 382/132 |
| 5,528,194 | 6/1996 | Ohtani et al. | 382/293 |
| 5,533,143 | 7/1996 | Takeo | 382/132 |

*Primary Examiner*—Leo Boudreau
*Assistant Examiner*—Bipin Shalwala
*Attorney, Agent, or Firm*—David A. Howley; Charles E. Snee, III

[57] ABSTRACT

To determine the orientation of a set of recorded images, the recorded images are scanned. The scanning operation obtains information regarding at least one scene characteristic distributed asymmetrically in the separate recorded images. Probability estimates of orientation of each of the recorded images for which at least one scene characteristic is obtained are determined as a function of asymmetry in distribution of the scene characteristic. Probability of orientation for the set of recorded images is determined from the probability estimates of orientation of each of the recorded images in the set.

15 Claims, 5 Drawing Sheets

WHOLE ORDER ORIENTATION METHOD AND APPARATUS

FIELD OF THE INVENTION

The present invention relates to the field of image processing, and more particularly, to a mechanism for automatically determinating the orientation of an order of recorded images.

BACKGROUND OF THE INVENTION

Automatic digital imaging applications, such as the production of photographs on compact discs, and index prints on such discs, digitally printed automatic album pages, etc., require that the images be correctly oriented before the final output image format is generated. Currently these automatic procedures must be interrupted by a skilled operator who manually corrects any orientation failures, such as vertical (portrait) or upside down images. Upside down or inverted images occur with 35 mm cameras and most SUC's (single use cameras) that use right side load film transports. In these types of cameras, the film is loaded on the opposite side of the film gate relative to "normal" configuration cameras. The images produced by these cameras will be inverted in the final output format unless the exposed films are identified as such. Manual sorting of film is not possible prior to processing, since there is no way to determine if the camera was of the reverse wind variety. SUC's can be sorted, but this is a time consuming and costly process.

The knowledge of the image orientation of a scene also has application to convention optical printing. For example, the yield (percentage of acceptable/saleable) of automatic exposure determination and subject classification algorithms used with optical printers would be increased if image orientation information were available.

Thus, there is currently a need for a mechanism, which, when applied to entire customer orders, can discriminate film images captured in left side load cameras from images that were captured in right side load cameras. There is also need for a mechanism for automatically determining the orientation of an entire order of recorded images that are being processed, without human intervention.

SUMMARY OF THE INVENTION

In accordance with the present invention the above described needs are satisfied by an image processing mechanism which is operative to determine the orientation of a set of recorded images, by scanning a plurality of recorded images, to obtain information regarding at least one scene characteristic distributed asymmetrically in the separate recorded images. Probability estimates of orientation of each of the recorded images for which at least one scene characteristic is obtained are the determined as a function of asymmetry in distribution of the scene characteristic. A probability of orientation is then determined for the set of recorded images from the probability estimates of orientation of each of the recorded images in the set.

The present invention determines the orientation of a set (or "order") of recorded images of scenes, by examining the characteristics of each scene along the two long sides of the image. These sides represent the top and bottom of a "landscape" orientation. For purposes of the invention, it will be assumed that characteristics would be found in some fraction of landscape images, which were asymmetrically distributed, top to bottom. For example, green grass color may be found more often along the bottom of a scene, and in the same scene not green grass color may be found more often along the top. By this logic, scenes with green grass color along both sides as well as scenes without green grass color along either side would be indeterminate with respect to that particular characteristic.

For instance, if a green color exceeding a certain saturation is found all along the one side of a scene and it is not found along the other side, then, in over 90% of images, the green side is at the bottom of the scene. As a result, when this characteristic is later found in another image, it may be expected that the probability of the green side being at the bottom would still be about 0.90. Another characteristic with an exploitable asymmetry of distribution than can be expected to be found in scenes is sky color along the top of the scene.

The magnitude of the difference defining the characteristic is an important factor in determining the degree of the asymmetry in the distribution. Furthermore, it was expected that finding repeated instances of a characteristic difference all across the image would also increase the asymmetry in the distribution. The asymmetry in the distribution is a direct measure of the probability of determining the orientation for that scene correctly. For example, using a hypothetical characteristic, with a low magnitude for the characteristic difference and a low number of instances of that characteristic found, the distribution of occurrences top to bottom is relatively flat. The opposite is the case when both the magnitude and the number of instances is high. In this example the preponderance of the cases occur at the top of the image for this hypothetical characteristic.

With the present invention, no operator intervention is required to correctly orient images in automatic, digitally generated applications including photo compact discs, index prints, and Photo CD album pages. Another advantage of the invention is that existing scene balance algorithms can be used to provide information to the orientation processor. The information obtained from the image orientation processor can then in turn be used to improve the performance of the scene balance algorithm.

The present invention has the advantage that low resolution scan data from a number of different techniques can be used to determine image orientation. Also, a reliable indication from only one scene is adequate to determine orientation of an entire order. However, if a reliable indication is not obtained from an individual scene, a preponderance of evidence from several images can still be adequate to determine orientation of the entire order.

DETAILED DESCRIPTION

Figure 1:
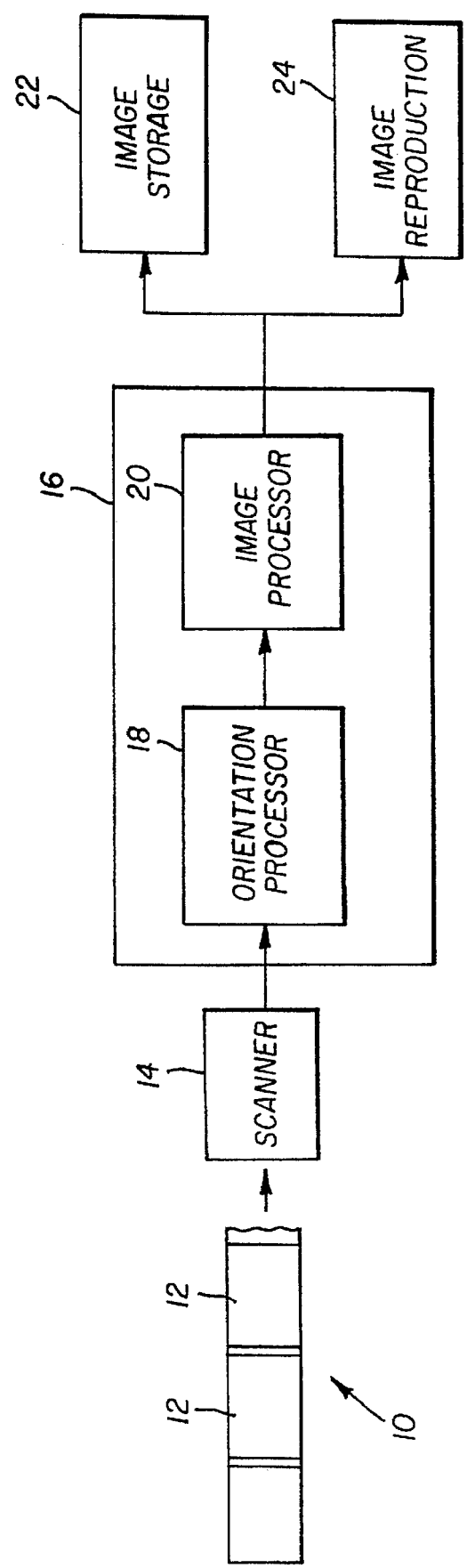
FIG. 1 shows a block diagram of an image processor constructed in accordance with an embodiment of the present invention.

Before describing in detail the new and improved mechanism for automatically determinating the orientation of an order of recorded images in accordance with the present invention, it should be observed that the present invention resides primarily in what is effectively a prescribed digital image processing technique that may be implemented by means of conventional digital signal processing circuitry, or may be embedded within image processing application software executable by the control processor of a digital image processing workstation, through which respective images of a scene are processed.

Consequently, the manner in which such images are scanned and applied to a digital image processor have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

Referring now to FIG. 1, a block diagram of an embodiment of the apparatus used to perform the method of the present invention is diagrammatically illustrated. The "whole order" orientation method of the present invention operates using prescan data from a continuous roll of negatives passing through a high volume scanner. The continuous roll of negatives 10 includes a plurality of individual recorded images or "frames" 12. A scanner 14 digitizes the information contained in the frames 12 and provides this digitized information to a processor 16. The processor 16 includes the orientation processor 18 of the present invention, and a conventional image processor 20 for performing further image processing, such as enhancement, enlargement, cropping, etc. The image processor 20 provides the processed images to either a storage device 22 and/or an image reproduction device 24, which can be a thermal printer, for example.

The data provided by the scanner 14 is a continuous stream of 128 pixel lines. Groups of 192 lines are collected into individual images by a conventional frame line detection algorithm collecting data in parallel with the orientation method of the present invention and finishing slightly ahead of the orientation process. Alternatively, the groups of lines are collected by a pre-prescan film notcher which detects and marks the frame boundaries. It is advantageous to limit buffering of these lines of data as much as possible, and to collect all the necessary information on the initial pass through the scan data.

Figure 2A:
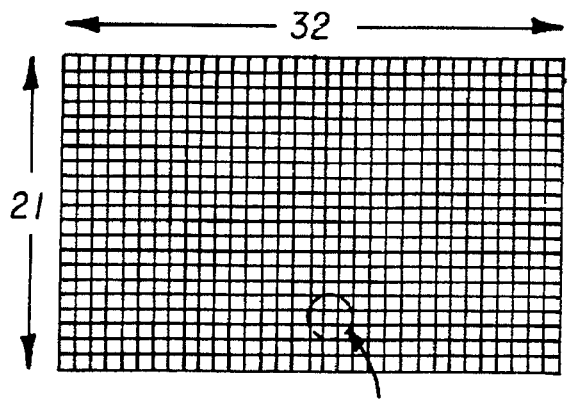
FIG. 2 illustrates an exemplary sampling grid for an image.
Figure 2B:
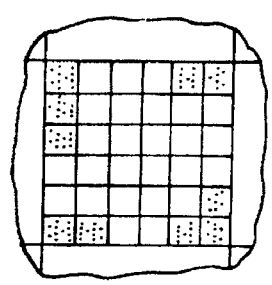

FIG. 2 shows an exemplary sampling scheme that is useful in the present invention. The image data is broken into 6 pixel by 6 line blocks. As can be seen, the 128×192 lines results in a grid of 21×32 sampling regions. (128=21×6(+2); and 192=32×6). This compares to currently used scene balance algorithms which use a 24×36 sampling grid. In an exemplary embodiment of the invention, the first and last pixel on each line are discarded.

Figure 3A:
FIGS. 3a and 3b illustrate the conversion of the 6×6 pixel array into 3×3 by subsampling.
Figure 3B:
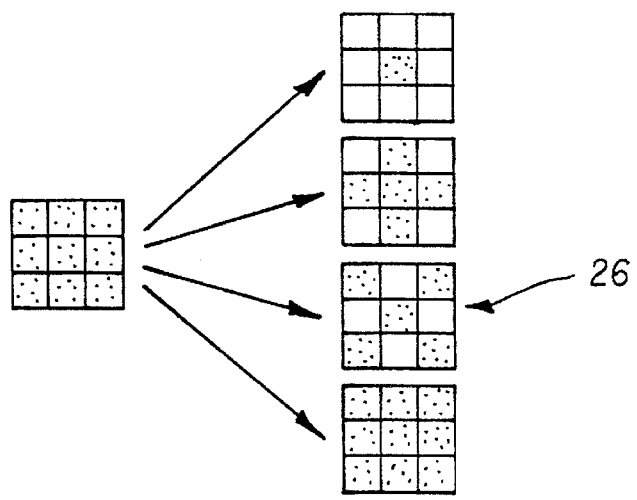

FIG. 3a shows that the pixels in each block are averaged together 2×2 into a 3×3 array of subsamples. The averaging is done in Log Exposure space, a common procedure for scene balance algorithms. The nine 2×2 averages can be used in a number of ways. One way is to generate a value which is representative of the image at that point in the 21×32 sampling grid. FIG. 3b shows alternative groupings of subsamples which could be averaged together to generate that representative value. In the preferred embodiment of the present invention, an "X" sampling pattern (reference numeral 26 in FIG. 3b) is used for all subsequent calculations. This pattern usually provides superior, or at least equal, results to any of the other options shown.

Figure 4A:
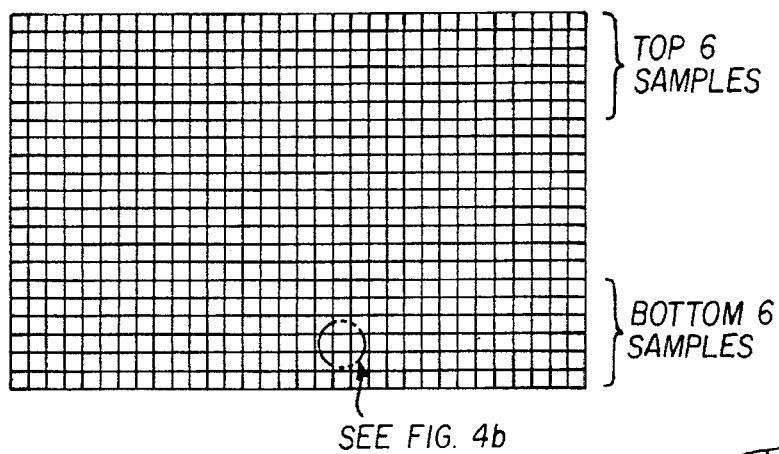
FIG. 4 shows an example of the regions of the image that may be sampled.
Figure 4B:
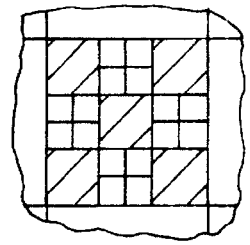

In order to sample and detect asymmetrically distributed characteristics, the orientation processor 18 defines two sampling regions along each side of the image. These regions (TOP and BTTM) are shown in FIG. 4. As can be seen, in this embodiment each region is six "samples" deep, although other depths of regions are also used in the preferred embodiment. Each sample comprises the five subsamples in the "X" pattern 26 of FIG. 2b. These subsamples are each 2×2 averages of the original pixels. Separate observations of each desired scene characteristic with a potential asymmetry in the distribution are made in each of the 32 lines from an image. A net count is kept for each characteristic which is found to exceed predetermined limits defining the asymmetry as the processing progresses across the image. If a value of the characteristic value is high in one direction, a counter is incremented; if it is high in the opposite direction, the counter is decremented. The net count for each of the different characteristics is then a measure which could be related to the probability that the bottom (or top) is on a particular side.

If an individual image is in fact in a portrait orientation, then the asymmetries should disappear because the characteristics would either be equally valued, or be randomly valued, on both the top and the bottom. This tends to result in null measures of the potential asymmetry.

Certain scene characteristics are more asymmetrically distributed than others, and thus are better predictors of the true orientation of the set of images (the whole order) than other scene characteristics. If it were possible to find one or more highly reliable characteristics in every scene, then this approach could be used to determine the orientation of individual scenes, although such characteristics are not presently known. However, for the full order orientation problem solved by the present invention, it is not necessary to find a useful characteristic in every image. Except for the extremely occasional odd instance, the landscape orientation of all the images in an entire order are either one side up or the other side up. Thus, by finding a reliable indication in even one image in an order, it is possible to determine the landscape orientation of the entire order using the present invention. Furthermore, even if the results from any single image are not conclusive, the preponderance of the evidence from several images may still be a reliable indication of the orientation for that order.

The success of an entire order orientation method depends upon finding reasonably reliable characteristics often enough in most orders so that a usefully accurate prediction of each order's (or set of images) orientation can be made. It also depends upon having a method for combining the orientation evidence (if any) from each image in one order. In embodiments of the present invention, the method of combining the evidence uses a Bayesian probability propagation model to sum up the results found in each of the frames of an order (set of images). Equations (1) below illustrates Bayes's Rule.

$$P_{last} = P_0 \qquad (1)$$

$$P_{current} = \frac{P_{last} \cdot P_{frame}}{(P_{last} \cdot P_{frame}) + ((1 - P_{last})(1 - P_{frame}))}$$

$$P_{last} = P_{current}$$

$$\vdots$$

NOTE: When $P_{last} = 0.5$,
$P_{current} = P_{frame}$
OR: When $P_{frame} = 0.5$,
$P_{current} = P_{last}$ Where:

1. $P_o$ is the probability of knowing the correct orientation for the order before any image is examined. This could be based, for instance, on the mix of right side load vs left side load cameras being processed at a given location.

2. $P_{last}$ is the probability of knowing the correct orientation for the order before the current image is examined.

3. $P_{frame}$ is the probability of knowing the correct orientation for the current image given the results of the observations made on that image.

4. $P_{current}$ is the probability of knowing the correct orientation for the order including the results from the observations made on the current image.

Bayes' Theorem requires that the probabilities refer to a set of mutually exclusive and exhaustive alternatives. In this application there are only two mutually exclusive alternatives, either the whole order is "right side up", or it is "up side down". If the P's refer to the probability of it being "right side up", then (1–P) is the probability that it is "up side down".

There are a number of advantageous characteristics of Bayes's Rule. First it provides a simple way to keep score for the entire order as the evidence from individual images is accumulated. When no useful evidence is found in the current image, then using $P_{frame}=0.5$ results in no change to $P_{current}$. Second, it is easy to see that the rule is commutative (i.e., if $P_{last}$ and $P_{frame}$ are interchanged, then the value of $P_{current}$ remains unchanged). More importantly, Bayes's Rule is also associative. This means that the net calculation from a series of images does not depend on the order in which it is done. Thus all the evidence from the images in an order can be accumulated and a probability of the orientation based purely on that evidence can be calculated before the effect of a mix of cameras (i.e. left side load vs. right side load) is introduced. This can be done simply by temporarily setting $P_0$ at the start of each order to 0.5. Ultimately the effect of the mix (i.e., the initial prior probability) can be included at the end. Its value can be adjusted at each user location as an independent parameter.

There are a number of factors which influence how well the present invention works. The following is a list of such factors:

1. The probability that a given characteristic correctly predicts the true orientation.

2. The probability of encountering the given characteristic in a typical mix of consumer images.

3. The correlation between successive encounters of the given characteristic within a customer order.

4. The number of images in the order.

5. The number of different characteristics that may be utilized.

6. The method to combine evidences from multiple characteristics found within a single image.

Pursuant to the present invention, when two or more characteristics are found in a single image, the joint probability for predicting the orientation correctly is not estimated. Instead, the probability associated with the most reliable characteristic is used. Future research may include trying a different method for assigning the orientation probability in those cases. It is possible, however, to provide for such an estimate of the joint probability.

The probability that a given characteristic correctly predicts the true orientation depends not only on the "truthfulness" of the characteristic for landscape type images, but also on the relative fraction of the time that the characteristic is mistakenly found in portrait type images. While certain characteristics are rarely found in portrait type images, this is not the case for other characteristics. Because of this, and because the mix of landscape and portrait types could vary from user to user or even for a given user slowly over time, the raw landscape probability for each characteristic must be adjusted to account for this fact. Equation (2) gives the necessary correction. It is based on the assumption that when an asymmetry measure is unfortunately found in a portrait free, it will give the correct answer half the time and an incorrect answer the other half of the time.

$$P_T = \frac{f_L \cdot P_M + (1 - f_L) f_{nL} \cdot 0.5}{f_L + (1 - f_L) f_{nL}} \qquad (2)$$

Where:

1. $P_T$ is the probability that the characteristic (measure), "M", gives the correct orientation for the given landscape and portrait mix.

2. $P_M$ is the probability that the characteristic, "M", gives the correct orientation for landscape images only.

3. $f_L$ is the fraction of all images which are landscape type.

4. $f_{P/L}$ is the ratio of portrait type to landscape type images in which characteristic "M" is found.

It has been determined that characteristics could be found whose "truthfulness" varied somewhat inversely with their frequency of occurrence. This presents the question as to which trade-off is a better strategy; finding less reliable characteristics in more images, or finding more reliable characteristics in fewer images. In experiments by the inventors on images where two different characteristics are "found", the probability associated with the more reliable characteristic was used. It was found that the higher the probability that a given characteristic correctly predicts the orientation, the better. The more frequently that a reasonably reliable characteristic is found, the fewer orders will be found with weak or no evidence, but the more orders with grossly wrong evidence will be found as well. (Grossly wrong evidence is defined as generating a probability for the orientation which is so wrong in magnitude that no reasonable prior probability could save that order from being improperly oriented.) The fewer the images in the order, the poorer the results (as expected). Considering the level of reliability of the characteristics found to date, excellent results should be obtained from orders with at least 24 images. If finding a characteristic in a order increases the probability of finding it again in that order (correlated scene content within an order), the overall performance over many orders does not change much, but the orders with grossly wrong evidence does increase. When either of two characteristics, or both, may be found, the performance of the less reliable one will dominate the creation of gross mistakes, but at the same time there are far fewer orders with little or no evidence.

For a whole order orientation method to be viable, it must work on the most popular order size which is 24 images. The results of simulations have suggested that what is needed is either a sufficiently large group of characteristics so that one with at least an 80% success rate is found in nearly every image, or a smaller group of characteristics with a 90% success rate which can be found in about 40% of all images. Furthermore, simulations have shown that predicting the orientation of three or four image film "chops" would require a group of characteristics which were found in over 90% of all images and all of which resulted in success rates exceeding 90%.

When one looks at a lot of images, one notices that some characteristics occur more frequently at the top of scenes and others occur more frequently at the bottom. Grass color and sky color are examples. For those characteristics that casual observations indicate have an asymmetrical distribution, the problem is reduced first to defining an exact measure for that characteristic and then to estimating the probability that exact measure correctly identifies the scene orientation. However, other useful characteristics may exist and be used in addition to those described below.

Figure 5:
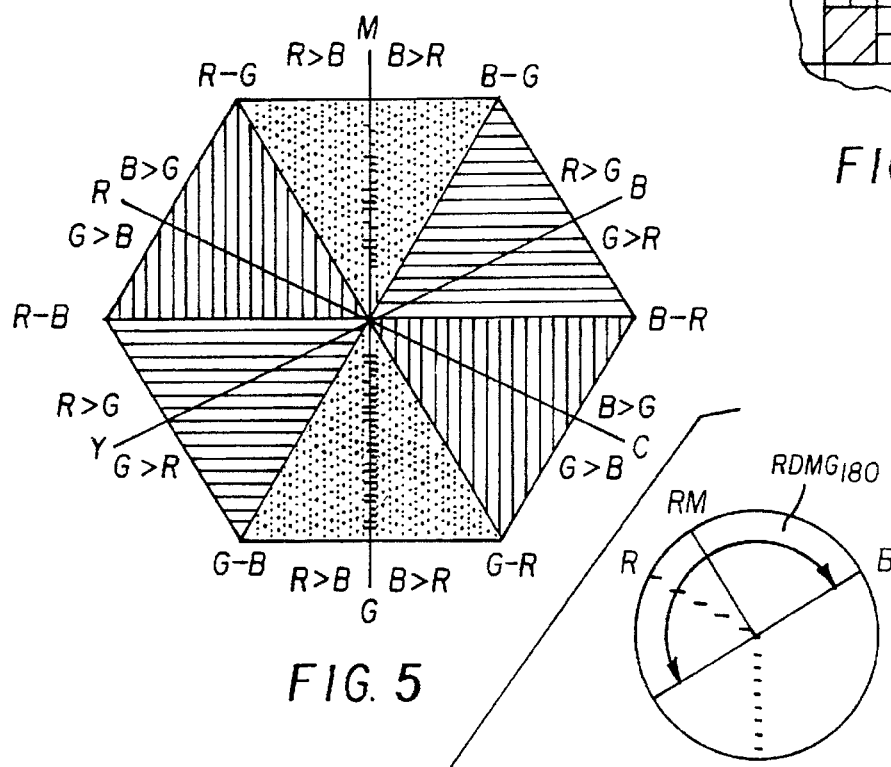
FIG. 5 shows color axes and hue regions for determining color definitions.

The exemplary embodiment of the present invention uses scene characteristics that have are asymmetrically distributed top to bottom. These scene characteristics involve both colors and (lack of) textures. The color aspect will be described first. The color axis may be defined by taking simple differences of the normalized primaries, and the hue range can be defined by simple comparisons of values. Even with these restrictions, one can define twelve color axes (i.e., the sign of the color difference is included in the definition of each unique color axis). One can also define three hue ranges about each color axis. Each color axis may be surrounded by a 60, a 120, or a 180 degree region. The color axis need not be centered on the hue region. To assign values to them, colors in the hue region are projected onto the color axis. FIG. 5 illustrates these color axes and hue regions. The test for hue boundaries defined by the primary color axes are shown to be comparisons between two colors. The test for hue boundaries defined by the color difference axes are not shown, but they are simply a test of whether a primary color is positive or negative.

Asymmetrically distributed grass and sky colors are found in a small fraction of all images. In addition, saturated red and blue is found to occur more often in the bottom of images than in the top. This may be due to the association of red and blue with human articles, coupled with the tendency of humans to be gravity bound to the lower portions of images. Unexpectedly the red color asymmetry occurs about as frequently as the green and blue color asymmetries combined. In experiments on a stored database of exemplary images, many fewer instances of the red asymmetry (out of the thirty-two potential instances in each image) had to be observed in order to signify a useful orientation probability.

Figure 6:
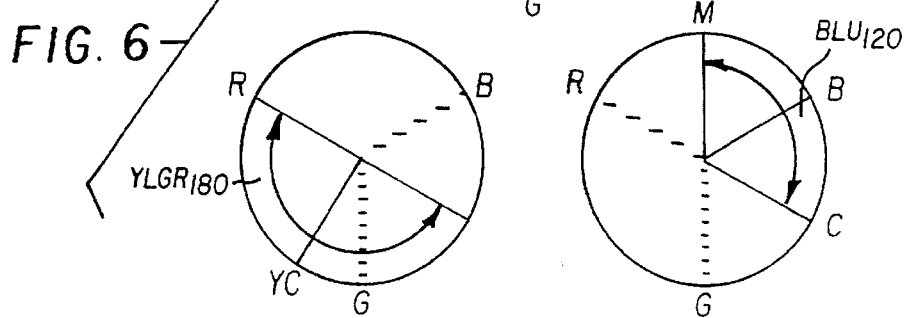
FIG. 6 shows exemplary optimum axes and hue ranges used in the determination of color definitions.

The optimum color axis and the optimum hue range to define each color asymmetry is illustrated in FIG. 6 for the exemplary images. For grass, the yellow green axis was slightly preferable to the pure green axis (i.e., pure green is given by G−(R+B)/2).

Equations (3) describe how the three colors are sampled and computed. Each primary color is normalized in certain embodiments of the invention by corresponding values from a scene balance algorithm before being used to define the chroma signal actually employed in the method of the invention.

$$R_X = ((R_{UL} + R_{UR} + R_{CTR} + R_{LL} + R_{LR})/5.0) - \hat{R} \quad (3)$$
$$G_X \text{ or } B_X = (\text{Similar to } R_X)$$
$$RDMG_{180} = R_X - G_X \text{ (Min = 0)}$$
$$YLGR_{180} = G_X - B_X \text{ (Min = 0)}$$
$$BLU_{120} = B_X - (R_X + G_X)/2.0$$
$$\text{IF}(B_X < G_X) \text{ or IF}(B_X < R_X) \; BLU_{120} = 0$$

Where:

1. $R_{UL}, R_{UR}, R_{CTR}, R_{LL}, R_{LR}$, are the five "X" subsample values.
2. $R_X$, $G_X$, and $B_X$ are the values assigned to each location in the 21×32 sampling grid.
3. $\hat{R}$, $\hat{G}$, and $\hat{B}$ are the estimated aims from the scene balance algorithm module.
4. $RDMG_{180}$ is the red magenta chroma values defining the red color characteristic.
5. $YLGR_{180}$ is the yellow green chroma values defining the green color characteristic (associated with grass in the scene).
6. $BLU_{120}$ is the blue chroma values defining the blue color characteristic (associated with blue sky in the scene).

The chroma value used is only one aspect of the characteristic. Other characteristics include the distribution of the chroma values, and their modulation. Equations (4) define the simple red, simple green, and simple blue measures used. As the equations show, all three measures are based upon counting the net number of times the difference of the two maxima found in the six samples at the top and the bottom of the image exceed a given threshold. (The term "top" and "bottom" refer to the opposite sides of the image. They are nominal terms only and are based on the scan direction relative to, say, left side load camera systems.)

Equations (4) and the subsequent equations are illustrative of the case when the regions are six samples deep (FIG. 4). When they are more or less than six samples deep, the equations should be modified in the obvious ways.

$$\text{For: } j_l = \text{sample line}[j_l = 0 \rightarrow 31] \quad (4)$$

$$\text{For: } i_p = \text{sample \#}[i_p = 0 \rightarrow 5]$$
$$\text{IF}(RDMG_{180} > RDMG^{topj}_{max}) RDMG^{topj}_{max} = RDMG_{180}$$
$$\text{IF}(YLGR_{180} > YLGR^{topj}_{max}) YLGR^{topj}_{max} = YLGR_{180}$$
$$\text{IF}(BLU_{120} > BLU^{topj}_{max}) BLU^{topj}_{max} = BLU_{120}$$
$$BLU^{topj}_{ave} = \frac{\sum_{i_p=0}^{5} BLU_{120}}{6}$$

$$\text{For: } i_p = \text{sample \#}[i_p = 15 \rightarrow 20]$$
$$\text{NOTE: do same calculatons as top}$$

$$\text{IF}((RDMG^{bttmj}_{max} - RDMG^{topj}_{max}) > \text{Thresh}_{RDMG}) RDMG_{cnt} \mathrel{+}= 1$$
$$\text{IF}((RDMG^{topj}_{max} - RDMG^{bttmj}_{max}) > \text{Thresh}_{RDMG}) RDMG_{cnt} \mathrel{-}= 1$$
$$YLGR_{cnt} = (\text{Similar to } RDMG_{cnt})$$
$$BLU_{cnt} = (\text{Similar to } RDMG_{cnt})$$

Where:

1. $RDMG^{top}_{max}$, $RDMG^{bttm}_{max}$ are the maximum values of $RDMG_{180}$ found at the top and the bottom of each sampling line.
2. $YLGR^{top}_{max}$, $YLGR^{bttm}_{max}$ are the maximum values of $YLGR_{180}$ found at the top and the bottom of each sampling line.
3. $BLU^{top}_{max}$, $BLU^{bttm}_{max}$ are the maximum values of $BLU_{120}$ found at the top and the bottom of each sampling line.

4. $BLU^{top}_{ave}$, $BLU^{bttm}_{ave}$ are the average values of $BLU_{120}$ found at the top and the bottom of each sampling line.

5. $Thresh_{RDMG}$, $Thresh_{YLGR}$, $Thresh_{BLU}$ are the thresholds by which the corresponding chroma values on one side of the image must exceed the chroma values on the other side of the image in order to define a potential asymmetry.

6. $RDMG_{cnt}$, $YLGR_{cnt}$, $BLU_{cnt}$ are color measures which signal the asymmetry if it is found. They represent the net number of times the corresponding chroma value exceeds the threshold on the expected side of the image.

Since the chroma values compared are defined to have only positive magnitudes, or 0, then $BLU_{cnt}$, for instance, can never be incremented or decremented by two YELLOW samples one of which is simply less yellow than the other, etc..

Figure 7:
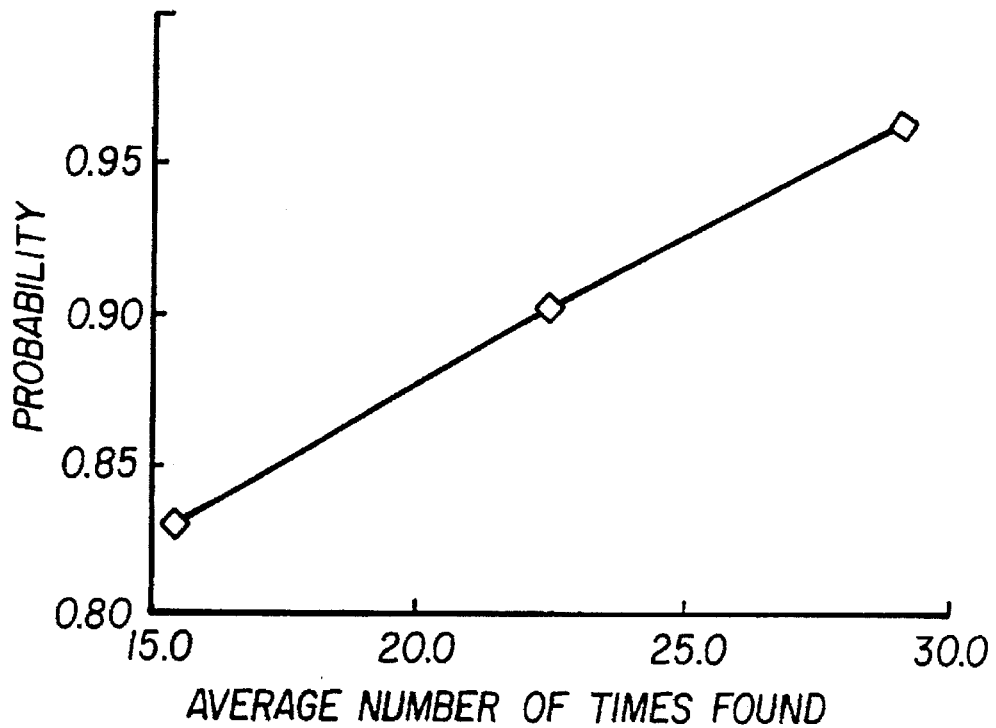
FIG. 7 is a graph illustrating the relationship of probability of correct orientation to the average number of times a characteristic is found in an image.
Figure 8A:
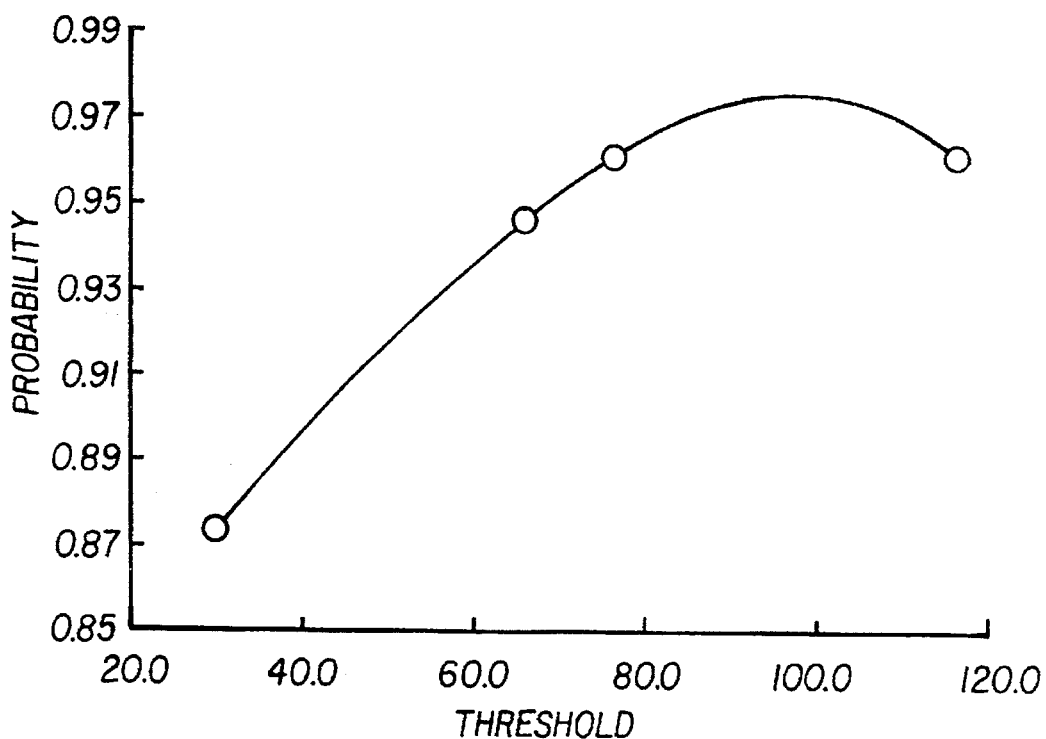
FIG. 8a illustrates the increase of probabilities as a threshold is raised.
Figure 8B:
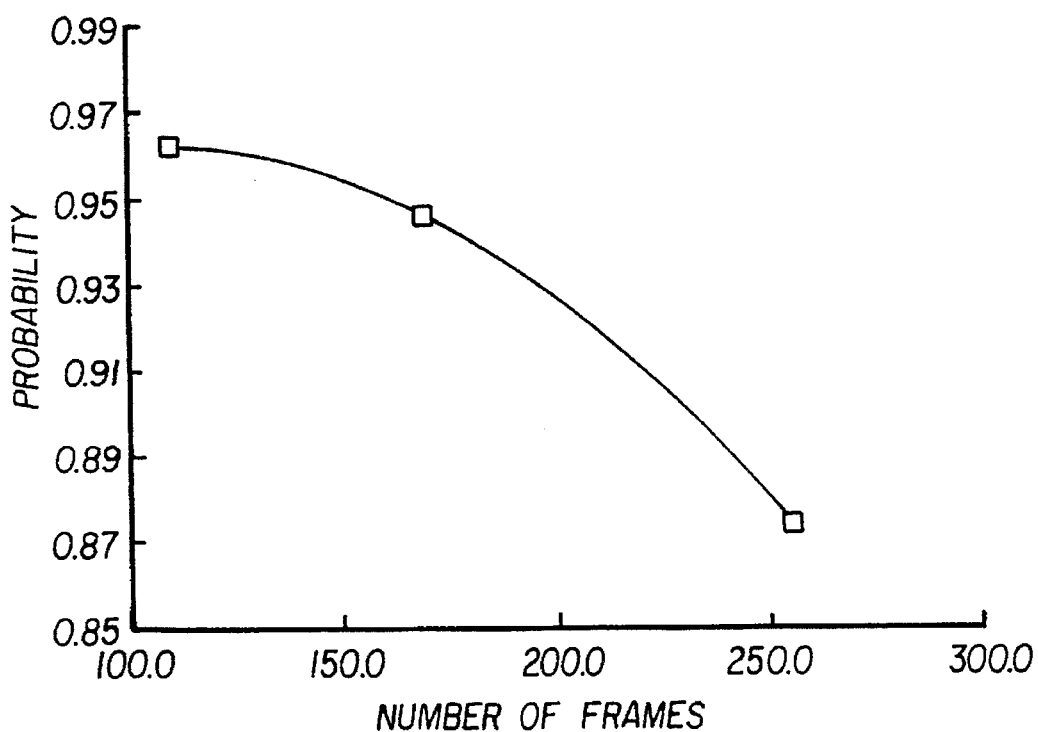
FIG. 8b illustrates the decrease in the probability of finding a high threshold as the number of images increases.

The results of experiments on different characteristics for a database of images showed that the red characteristic requires a far lower net count than the green characteristic in order to signal a useful asymmetry of distribution. In fact the simple green color must be found across virtually the entire image in order to have a useful asymmetry. However, when it is found, the probability of knowing the correct orientation is very good (around 95%). FIG. 7 illustrates that the probability tends to increase as the number of lines in which asymmetry is found increases. Furthermore, the probabilities generally increase as the threshold is raised. FIG. 8A illustrates this for the simple green color when it is found in all 32 sampling lines. Unfortunately, of course, the number of images found with that degree of difference goes down as is shown in FIG. 8B.

Table 1 below illustrates a sampling of results typical of those used to decide on the exact definition of the "red" characteristic. It shows the fraction of images and the probabilities for several possible definitions of the red characteristic using results obtained by combining results into one coarse and one finer histogram cell for various threshold ranges.

The red characteristics are defined as follows:

1. $RDMG_{180}$ the red characteristic defined above (i.e., a red characteristic projected onto the R-G axis).

2. $RDMG_{120}$ the same definition as $RDMG_{180}$ except restricted to a 120 hue range surrounding the R-G axis.

3. $RDMG_{rd120}$ the same definition as $RDMG_{180}$ except restricted to a 120 hue range centered on the R-(G+B)/2 axis.

4. $RED_{ry120}$ is a red characteristic which is projected on the R-(G+B)/2 axis and is restricted to a 120 hue range centered on the R-B axis.

None of the definitions of red result in the best performance (highest percent of images with the highest probability) for all combinations of threshold range and net count. However, $RDMG_{180}$ is generally among the best in all the ranges listed. In the present invention, similar judgements are made for each of the characteristics that are to be used in the determination of orientation.

TABLE 1

COMPARISON OF PERFORMANCE OF
SEVERAL RED CHARACTERISTICS

| CHARAC-TERISTIC | THRESHOLD RANGE & NET COUNT | PERCENT ALL FRAMES | PROBABILITY RED ON BOTTOM |
|---|---|---|---|
| $RDMG_{180}$ | 400–600 | 6.3 | .800 |
| $RDMG_{120}$ | net count | 6.9 | .786 |
| $RDMG_{rd120}$ | 6 to 32 | 6.3 | .787 |
| $RED_{ry120}$ | | n/a | n/a |
| $RDMG_{180}$ | 600–800 | 2.9 | .858 |
| $RDMG_{120}$ | net count | 3.2 | .836 |
| $RDMG_{rd120}$ | 6 to 32 | 3.0 | .860 |
| $RED_{ry120}$ | | 3.5 | .826 |
| $RDMG_{180}$ | >800 | 2.2 | .932 |
| $RDMG_{120}$ | net count | 2.6 | .925 |
| $RDMG_{rd120}$ | 6 to 32 | 2.2 | .932 |
| $RED_{ry120}$ | | 2.2 | .870 |
| $RDMG_{180}$ | 600–800 | 1.9 | .836 |
| $RDMG_{120}$ | net count | 1.9 | .818 |
| $RDMG_{rd120}$ | 4 to 5 | 1.9 | .813 |
| $RED_{ry120}$ | | 2.3 | .831 |
| $RDMG_{180}$ | >800 | 1.3 | .828 |
| $RDMG_{120}$ | net count | 1.5 | .794 |
| $RDMG_{rd120}$ | 4 to 5 | 1.3 | .834 |
| $RED_{ry120}$ | | 1.6 | .832 |

Another asymmetry which may be observed in typical consumer images is that unmodulated areas tend to be found at the top of scenes more often than at the bottom. Equations (5) define a characteristic which attempts to capture this asymmetry. It defines a uniformity characteristic based on the GREEN Log Exposure values within each sampling grid. Since color is not an issue, scene normalization is not needed.

$$\text{For: } j_l = \text{sample line}[j_l = 0 \rightarrow 31] \quad (5)$$
$$\text{For: } i_p = \text{sample \#}[i_p = 0 \rightarrow 5]$$
$$\text{For: } k_X = X \text{ sample}[k_X = ul, ur, ctr, ll, lr]$$
$$\bar{G}_{k_X} = (G_{11} + G_{12} + G_{12} + G_{22})/4.0$$

$$\Delta G_{k_X} = (|G_{11} - \bar{G}_{k_X}| + |G_{12} - \bar{G}_{k_X}| + |G_{21} - \bar{G}_{k_X}| + |G_{22} - \bar{G}_{k_X}|)/4.0$$

$$\Delta G^i_{ave} = \sum_{k_X} \Delta G_{k_X}$$

$$\text{IF}(\Delta G^i_{ave} > \Delta G^{topj}_{max}) \Delta G^{topj}_{max} = \Delta G^i_{ave}$$
$$\text{IF}(\Delta G^i_{ave} < \Delta G^{topj}_{min}) \Delta G^{topj}_{min} = \Delta G^i_{ave}$$

$$\Delta G^{topj}_{ave} = \Delta G^{topj}_{adjave} = \frac{\sum_{i_p=0}^{5} \Delta G^{ip}_{ave}}{6}$$

$$XNR = 1.5 \left[ \frac{\Delta G^{topj}_{max} + \Delta G^{topj}_{min} - 2\Delta G^{topj}_{ave}}{\Delta G^{topj}_{max} - \Delta G^{topj}_{min}} \right]$$

IF(XNR > 0.2)then:

$$\Delta G^{topj}_{adjave} = \left(1.0 - \frac{(XNR - 0.2)}{0.8}\right) \Delta G^{topj}_{ave} +$$

$$\left(\frac{(XNR - 0.2)}{0.8}\right) \left(\frac{6\Delta G^{topj}_{ave} - \Delta G^{topj}_{max}}{5}\right)$$

For: $i_p$ = sample #[$i_p$ = 15 → 20]
NOTE: do same calculations as at top

-continued $$\text{IF}(\Delta G^{topj}_{ave} > G_{lowlim})\&$$
$$\text{IF}(\Delta G^{topj}_{adjave} < \text{Thresh}_1 \,\&\, \Delta G^{btmj}_{adjave} > \text{Thresh}_2)\Delta G_{cnt} + = 1$$
$$\text{IF}(\Delta G^{bttmj}_{ave} > G_{lowlim})\&$$
$$\text{IF}(\Delta G^{bttmj}_{adjave} < \text{Thresh}_1 \,\&\, \Delta G^{bttmj}_{adjave} > \text{Thresh}_2)\Delta G_{cnt} - = 1$$

Where:

1. $G_{kx}$ is the average Green Log Exposure for each of the 5 components of the "X" subsamples from the top or bottom of the sampling line.

2. $\Delta G_{kx}$ is the absolute deviation of each element from their average for each of the 5 components of the "X" subsamples from the top or bottom of the sampling line.

3. $\Delta G^i_{ave}$ is the average deviation at each of the "X" subsamples from the top or bottom of the sampling line.

4. $\Delta G^{top}_{max}$, $\Delta G^{top}_{min}$, $\Delta G^{bttm}_{max}$, $\Delta G^{bttm}_{min}$ are the maximum and minimum average differences found in the top and bottom of the sampling line.

5. $\Delta G^{top}_{ave}$, $G^{bttm}_{ave}$ are the average of the average differences found in the top and bottom of the sampling line.

6. XNR is a (standardized) measure of the skew of the distribution of the values making up $\Delta G^{top}_{ave}$ and $G^{bttm}_{ave}$. XNR ranges between −1 and 1.

7. $\Delta G^{top}_{adjave}$, $\Delta G^{bttm}_{adjave}$ are the average of the average differences after adjustment for excessive skewness which is found in the top and bottom of the sampling line.

8. $G_{lowlim}$ is an image value slightly exceeding the image value resulting from underexposure of a low reflectance object.

9. Thresh$_1$ lower threshold and Thresh$_2$ is the upper threshold which defines the potential asymmetry in smoothness.

10. $\Delta G_{cnt}$ is the smoothness measure which signals the asymmetry if it is found. It represents the net number of times a smooth region was found on the expected side of the image.

There are an almost unlimited number of ways to define a region with low modulation. In the above equations, an adjustment is made using a parameter called XNR. This is a statistic used for a number of years in known scene balance algorithms. It detects, among other things, low modulance snow scenes which for many years were printed too dark by automated printers. Equations (6) further illustrate the use of XNR to reduce, or eliminate, the effect of one unusually high value from an average of n otherwise similar values. By its original definition, XNR could range in value from $$-\frac{n-2}{n} \text{ to } \frac{n-2}{n}.$$

In the present invention, XNR has been standardized to a value of −1 to 1. Its utility arises when the six samples in a line lie in a basically uniform region which, however, touches a modulated region on one end or the other, or which crosses a minor modulation such as a power line. In these instances, the single misleading modulation is discounted by the adjustment. This type of adjustment is also made in defining some of the other measures to be described below.

$$XNR_{std} = \frac{(V_{max} + V_{min} - 2V_{ave})}{V_{max} - V_{min}} \times \frac{n}{n-2} \quad (6)$$

IF($XNR_{std} > 0.2$):

$$V_{adj} = \left(1 - \left(\frac{XNR_{std} - 0.2}{0.8}\right)\right)V_{ave} +$$

-continued $$\left(\frac{XNR_{std} - 0.2}{0.8}\right)\frac{(nV_{ave} - V_{max})}{(n-1)}$$

Where:

1. $XNR_{std}$ is the standardized measure of skew of the distribution of the values to possibly be adjusted.

2. $V_{max}$, $V_{min}$, $V_{ave}$ are the maximum, minimum, and average of the distribution of values to possibly be adjusted.

3. n is the number of values making up the sample.

4. $V_{adj}$ is the value of $V_{ave}$ adjusted for excessive positive skew. The adjustment is obviously a linear interpolation between the average including $V_{max}$ and the average excluding $V_{max}$.

Figure 9:
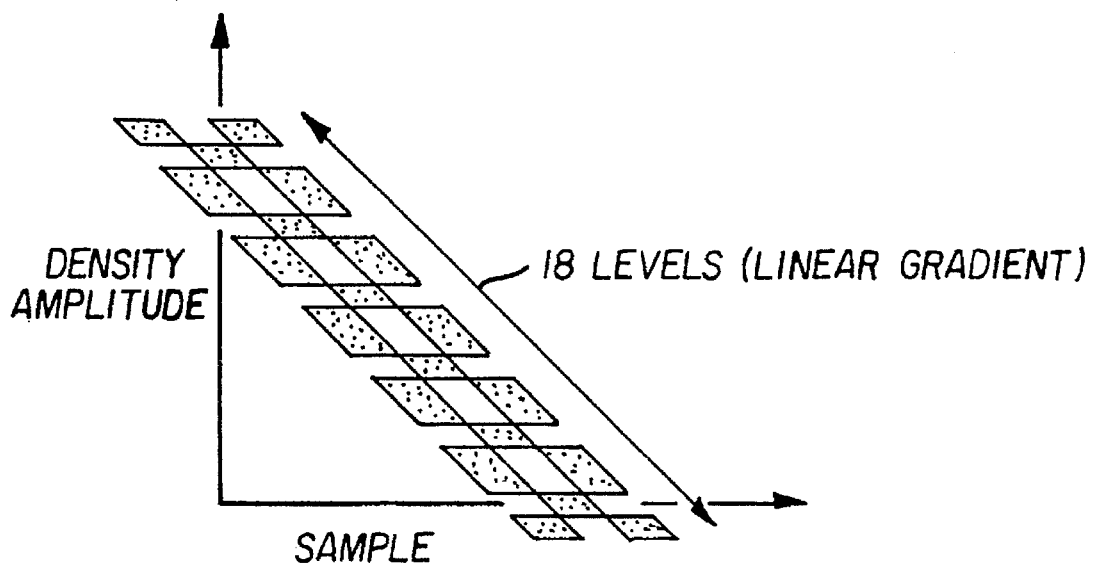
FIG. 9 shows a uniform density gradient model.

Returning to the simple uniformity characteristic, its definition of smoothness may be confused by a uniform gradient, such as is produced by a point source illuminating an extended uniform surface, or a heavily vignetting lens. The final characteristic to be described was designed to recognize a uniform linear gradient. FIG. 9 illustrates this concept. There are six "X" samples in both the top and bottom of each sampling line. A Chi Squared like test is run to test the hypothesis that the values of the subsamples lie on a linear gradient. The eighteen expected levels are defined by a linear interpolation (extrapolation) between two end points defined by the centers of the first and last "X". The expected values assigned to these two centers are simply the average of the five values making up the "X" sample at that location. Equations (7) define the smooth gradient measure.

For: $j_i$ = sample line[$j_i$ = 0 → 31] (7)

$$G^{str0}_{aim} = \left[\frac{G_{ul}(0) + G_{ur}(0) + G_{ctr}(0) + G_{ll}(0) + G_{lr}(0)}{5}\right]$$

$$G^{top}_{grad} = \frac{\left[\frac{G_{ul}(5) + G_{ur}(5) + G_{ctr}(5) + G_{ll}(5) + G_{lr}(5)}{5}\right] - G^{str0}_{aim}}{15}$$

For: $i_p$ = sample #[$i_p$ = 0 → 5]
For: $k_X = X$ sample[$k_X = ul, ur, ctr, ll, lr$]
Offset($k_X$) = [−1,−1,0,1,1]

$$G^{topj}_{\chi^2} = \sum_{i_p=0}^{5} \sum_{k_X} \frac{\{G(k_X) - (G^{str0}_{aim} + G^{top}_{grad}(3i_p + \text{Offset}(k_X)))\}^2}{(G^{str0}_{aim} + G^{top}_{grad}(3i_p + \text{Offset}(k_X)))}$$

.
.
.

For: $i_p$ = sample #[$i_p$ = 15 → 20]
NOTE: do same calculations as at top $$\text{IF}(\Delta G^{topj}_{ave} > G_{lowlim})\&$$
$$\text{IF}(G^{topj}_{\chi^2} < \text{Thresh}_{A1} \,\&\, G^{btmj}_{\chi^2} > \text{Thresh}_{A2})G_{\chi^2 cnt} + = 1$$
$$\text{IF}(\Delta G^{bttmj}_{ave} > G_{lowlim})\&$$
$$\text{IF}(G^{bttmj}_{\chi^2} < \text{Thresh}_{A1} \,\&\, G^{topj}_{\chi^2} > \text{Thresh}_{A2})G_{\chi^2 cnt} - = 1$$

Where:

1. $G^{str0}_{aim}$, $G^{str15}_{aim}$ are the average of the five subsamples at the start of the top and bottom of each line.

2. $G^{top}_{grad}$, $G^{bttm}_{grad}$ are the aim gradients between the start and end of the top and bottom sections of each line.

3. $G^{topj}_{\chi^2}$, $G^{bttmj}_{\chi^2}$ are the measures of deviation of the actual data from the expected linear gradient.

4. Thresh$_{A1}$, Thresh$_{A2}$ are the threshold on the deviations from the linear gradient which define asymmetry of the distribution of regions of smooth uniform gradients.

5. $G_{lowlim}$ is an image value slightly exceeding the image value resulting from underexposure.

6. $G_{\chi^2 cnt}$ is the smooth uniform gradient measure which signals the asymmetry if it is found. It represents the net number of times a relatively smooth uniform gradient is found on the expected side of the image.

Table 2 lists the measures used in an exemplary embodiment of the present invention. This table shows the thresholds, the counts signaling the asymmetry in the distribution, the region depth in samples, the probability that this measure predicts the correct orientation in landscape images, the probability of finding this measure in a landscape image, and the ratio of the probabilities of finding this measure in a portrait image to finding it in a landscape image. The characteristics $G_{smth}$ and $G_{grad}$ are segregated into two categories depending on the value of $BLU(120)_{ave}$ from equations (4). The threshold categories combined with the count limits generate unique categories within a measure type. No measure is used that has a landscape probability below 0.80 of predicting the correct orientation.

mined whether the characteristics used in the inventive method are independently useful. It was found that for the most part, the characteristics are independently useful.

Table 3 is an attempt to address that question. It has separate columns for Database 1 and Database 2, representing different sets of images.

There is a similarity of results for the two databases. Each array of numbers shows the results when the measure at the top left of the array was the one used to predict the orientation for those particular images. Each row shows the results either for that same measure (marked by **) or for the other measures which happened to also be found in the same images but which actually represented a less reliable indication of the orientation in those particular images. The first column (column #0) is the total number of images in which that measure was found, and the following columns are the numbers of images for each range of the measure defined in Table 2. The last column in Table 2 gives the

TABLE 2

ORIENTATION ALGORITHM THRESHOLDS AND PROBABILITIES

| MEASURE | THRESHOLD | EXCESS LINES | REGION DEPTH | PROB CORRECT | % OF LANDSCAPE FRAMES | PORTRAIT LANDSCAPE RATIO | # |
|---|---|---|---|---|---|---|---|
| RDMG | 400–800 | 5–7 | 4 | 0.849 | 4.4% | 1.02 | 1 |
| (180) | 400–600 | 8–10 | 6 | 0.864 | 1.7 | 1.20 | 2 |
| " | 400–600 | 11–32 | 7 | 0.881 | 2.7 | 0.48 | 3 |
| " | 600–800 | 11–32 | 7 | 0.915 | 1.2 | 0.56 | 4 |
| " | 600 | 8–10 | 6 | 0.941 | 1.7 | 0.51 | 5 |
| " | 800 | 5–7 | 4 | 0.983 | 1.5 | 0.38 | 6 |
| " | 800 | 11–32 | 7 | 0.999 | 0.5 | 0.88 | 7 |
| YLGR | 100–275 | 32 | 5 | 0.884 | 3.7 | 0.06 | 1 |
| (180) | 275 | 27–31 | 4 | 0.912 | 0.9 | 0.13 | 2 |
| " | 275 | 32 | 5 | 0.963 | 0.7 | 0.001 | 3 |
| BLU(120) | 675 | 5–32 | 6 | 0.999 | 0.6 | 0.20 | 1 |
| Gsmth | 5.5–10.5 | 4–6 | 5 | 0.960 | 2.5 | 1.20 | 1 |
| (BLU120 > | 7.0–8.0 | 17–24 | 4 | 0.961 | 2.6 | 0.08 | 2 |
| 60) | 5.5–10.5 | 7–10 | 4 | 0.964 | 2.1 | 1.10 | 3 |
| " | 7.0–8.0 | 11–16 | 4 | 0.982 | 2.8 | 0.43 | 4 |
| " | 7.0–8.0 | 25–32 | 4 | 0.999 | 2.6 | 0.001 | 5 |
| Gsmth | 5.5–10.5 | 4–6 | 5 | 0.918 | 6.5 | 0.82 | 6 |
| (BLU120 < | 5.5–10.5 | 7–10 | 6 | 0.959 | 3.7 | 0.67 | 7 |
| 60) | 7.0–8.0 | 25–32 | 4 | 0.959 | 1.8 | 0.12 | 8 |
| " | 5.5–10.5 | 17–24 | 4 | 0.960 | 2.5 | 0.18 | 9 |
| " | 5.5–10.5 | 11–16 | 4 | 0.962 | 3.3 | 0.54 | 10 |
| Ggrad | 0.08–0.68 | 7–22 | 4–5 | 0.878 | 1.2 | 0.54 | 1 |
| (BLU120 > | 0.08–0.68 | 4–6 | 4 | 0.899 | 3.3 | 0.98 | 2 |
| 60) | 0.08–0.68 | 7–22 | 5 | 0.965 | 4.3 | 0.33 | 3 |
| " | 0.08–0.68 | 23–32 | 4 | 0.999 | 1.4 | 0.001 | 4 |
| Ggrad | 0.08–0.68 | 7–22 | 4–5 | 0.861 | 2.7 | 0.97 | 5 |
| (BLU120 < | 0.08–0.68 | 4–6 | 4 | 0.875 | 6.2 | 0.78 | 6 |
| 60) | 0.08–0.68 | 7–22 | 5 | 0.889 | 6.1 | 0.42 | 7 |
| " | 0.08–0.68 | 23–32 | 4 | 0.968 | 0.8 | 0.14 | 8 |

The below described test by the inventors made use of two data bases. The first data base (Database 1) was generated from an actual prescan (128×192) of a set of negatives and contains 2183 images. The entire data set is in three files (a red pixel file, a green file, and a blue file). The second data base (Database 2) was generated by averaging down, from 1308×1932 to 128×192, the data from 2697 individual images scanned by the a 35 mm area array scanner. It was assembled by sampling (usually) nine images from about 290 different customer orders. This data was converted to the same Scene Log Exposure metric as was used for Database 1, and was assembled into several red, green, and blue pixel data files.

In the test of the present invention on the sample databases of images performed by the inventors, it was deternumber of the column in Table 3 associated with that range. For instance in the array for Database 1 labeled $RDMG_{180}$ there were 210 images for which $RDMG_{180}$ was the characteristic used to predict the orientation for that image. Furthermore, 75 times the first measure defined in Table 2 (with a probability of 0.849 of giving the correct orientation) was the measure used, 26 times the second measure from Table 2 was used, etc. Thus 210=75+26+35+15+22+27+10. Other less reliable measures were also found in some of those 210 images. For instance, 15 times the Gsmth measure was also found. However in everyone of those 15 cases, the probabilities associated with those measures were lower than the probability of the $RDMG_{180}$ measure used.

The results shown in Table 3 may be used to illustrate two considerations. The first is the practical effectiveness of each of the measures used in the orientation method of the invention. The table shows that for most of the measures there were some images for which that measure was the only indication of orientation. For instance consider Gsmth. Even after subtracting all the other instances where a measure with a lower probability could have been used, there are still at least 128 images in Database 1 (128=620-51-44-0-397) and at least 13 images in Database 2 (13=371-41-26-0-291) for which there was no other measure found.

try in the distribution translates into probability estimates for the orientation of each scene in which it is found. The probability of orientation for each order is calculated from the probability of orientation for each frame using the Bayesian probability propagation model. The hope is to detect asymmetrically distributed characteristics in enough scenes in each order so that the Bayesian probability propagation model predicts the orientation for that order with a high degree of reliability.

TABLE 3

| | DATABASE 1 | | | | | | | | | | | DATABASE 2 | | | | | | | | | | |
|---|---|---|---|---|---|---|---|---|---|---|---|---|---|---|---|---|---|---|---|---|---|
| RDMG(180) | | | | | | | | | | | | | | | | | | | | | | |
| **RDMG | 210 | 75 | 26 | 35 | 15 | 22 | 27 | 10 | 0 | 0 | 0 | 232 | 81 | 48 | 26 | 18 | 24 | 25 | 10 | 0 | 0 | 0 |
| YLGR | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| BLU | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Gsmth | 15 | 1 | 0 | 0 | 1 | 0 | 7 | 3 | 0 | 1 | 2 | 7 | 0 | 0 | 0 | 0 | 0 | 6 | 0 | 0 | 0 | 1 |
| Ggrad | 9 | 0 | 1 | 0 | 0 | 0 | 7 | 1 | 0 | 0 | 0 | 8 | 0 | 0 | 0 | 0 | 5 | 2 | 1 | 0 | 0 | 0 |
| YLGR(180) | | | | | | | | | | | | | | | | | | | | | | |
| RDMG | 0 | 0 | 0 | 0 | 0 | 0 | 0 | 0 | 0 | 0 | 0 | 9 | 4 | 2 | 3 | 0 | 0 | 0 | 0 | 0 | 0 | 0 |
| **YLGR | 66 | 48 | 9 | 9 | 0 | 0 | 0 | 0 | 0 | 0 | 0 | 40 | 20 | 13 | 7 | 0 | 0 | 0 | 0 | 0 | 0 | 0 |
| BLU | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Gsmth | 9 | 3 | 0 | 4 | 2 | 0 | 0 | 0 | 0 | 0 | 0 | 3 | 0 | 2 | 0 | 1 | 0 | 0 | 0 | 0 | 0 | 0 |
| Ggrad | 8 | 0 | 5 | 3 | 0 | 0 | 0 | 0 | 0 | 0 | 0 | 5 | 1 | 1 | 3 | 0 | 0 | 0 | 0 | 0 | 0 | 0 |
| BLU(120) | | | | | | | | | | | | | | | | | | | | | | |
| RDMG | 0 | 0 | 0 | 0 | 0 | 0 | 0 | 0 | 0 | 0 | 0 | 5 | 2 | 0 | 0 | 0 | 1 | 1 | 1 | 0 | 0 | 0 |
| YLGR | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| **BLU | 8 | 8 | 0 | 0 | 0 | 0 | 0 | 0 | 0 | 0 | 0 | 15 | 15 | 0 | 0 | 0 | 0 | 0 | 0 | 0 | 0 | 0 |
| Gsmth | 2 | 0 | 0 | 0 | 0 | 0 | 1 | 0 | 0 | 0 | 1 | 1 | 0 | 0 | 0 | 0 | 0 | 1 | 0 | 0 | 0 | 0 |
| Ggrad | 1 | 0 | 0 | 0 | 0 | 0 | 1 | 0 | 0 | 0 | 0 | 3 | 0 | 1 | 0 | 0 | 1 | 1 | 0 | 0 | 0 | 0 |
| Gsmth | | | | | | | | | | | | | | | | | | | | | | |
| RDMG | 51 | 30 | 9 | 6 | 0 | 1 | 4 | 1 | 0 | 0 | 0 | 41 | 14 | 13 | 6 | 4 | 3 | 0 | 1 | 0 | 0 | 0 |
| YLGR | 44 | 32 | 3 | 9 | 0 | 0 | 0 | 0 | 0 | 0 | 0 | 26 | 17 | 7 | 2 | 0 | 0 | 0 | 0 | 0 | 0 | 0 |
| BLU | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| **Gsmth | 620 | 23 | 44 | 20 | 37 | 64 | 154 | 79 | 23 | 75 | 101 | 371 | 27 | 41 | 14 | 56 | 35 | 97 | 38 | 1 | 24 | 38 |
| Ggrad | 397 | 18 | 34 | 53 | 16 | 62 | 75 | 139 | 0 | 0 | 0 | 291 | 39 | 25 | 65 | 10 | 30 | 59 | 63 | 0 | 0 | 0 |
| Ggrad | | | | | | | | | | | | | | | | | | | | | | |
| RDMG | 9 | 4 | 3 | 2 | 0 | 0 | 0 | 0 | 0 | 0 | 0 | 14 | 7 | 4 | 0 | 1 | 1 | 0 | 1 | 0 | 0 | 0 |
| YLGR | 1 | 1 | 0 | 0 | 0 | 0 | 0 | 0 | 0 | 0 | 0 | 4 | 4 | 0 | 0 | 0 | 0 | 0 | 0 | 0 | 0 | 0 |
| BLU | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Gsmth | 42 | 1 | 2 | 5 | 1 | 0 | 10 | 2 | 18 | 1 | 2 | 23 | 0 | 3 | 5 | 1 | 0 | 5 | 0 | 6 | 2 | 1 |
| **Ggrad | 155 | 5 | 14 | 9 | 3 | 21 | 47 | 35 | 21 | 0 | 0 | 139 | 4 | 25 | 8 | 4 | 22 | 48 | 20 | 8 | 0 | 0 |

The second consideration is whether the occurrence of the characteristics in each image are independent events or not. For some characteristics such as Gsmth and Ggrad, it is obvious that they are not independent. Although definition of measures which are independently distributed across all images would be useful, this typically is not possible. What is required is that each measure contributes enough unique information to the orientation detection process to justify the expense of its calculation.

Although an exemplary embodiment of the present invention has been described with the use of specific scene characteristics helpful in determining orientation, other equally valid approaches to detecting the orientation of individual scenes, and thus the entire order, may be taken within the scope of the invention. For instance, if human faces can be recognized, then their orientation in the image would be a very reliable indicator of the orientation of the scene. Alternatively, some vertical vs horizontal asymmetry in the frequency content of edges could be detected.

The present invention provides a method and device that determines the orientation of entire customer orders by looking for scene characteristics that are distributed asymmetrically top to bottom in landscape scenes. The asymme- The present invention uses image processing components that are known to those of ordinary skill in the art, and which are readily programmable by those of ordinary skill to perform the method of the present invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of determining orientation of a set of recorded images, comprising the steps of:
   (a) scanning a set of recorded images, said set including a plurality of recorded images, to obtain information regarding at least one scene characteristic distributed asymmetrically in the separate recorded images;
   (b) determining probability estimates of orientation of each of the recorded images for which at least one scene characteristic is obtained as a function of asymmetry in distribution of the scene characteristic; and
   (c) determining a probability of orientation for said set of recorded images from the probability estimates of orientation of each of the recorded images in said set.

2. A method according to claim 1, further comprising the step of (d) image processing said set of recorded images according to the probability of orientation for said set of recorded images, determined in step (c).

3. A method according to claim 1, wherein step (c) of determining the probability of orientation for the set of recorded images is carried out using a Bayesian probability propagation model.

4. A method according to claim 1, wherein said at least one scene characteristic is color.

5. A method according to claim 1, wherein said at least one scene characteristic is modulation.

6. A method according to claim 1, wherein said step (a) of scanning comprises obtaining information regarding a plurality of scene characteristics.

7. A method according to claim 6, wherein said step (c) of determining probability of orientation for the set of recorded images is carried out employing information from different scene characteristics of the plurality of scene characteristics to determine said probability of orientation.

8. A method according to claim 7, wherein at least some of the plurality of scene characteristics are correlated to one another.

9. An apparatus for determining orientation of a set of individual recorded images, comprising:
- a scanner which is operative to scan recorded images and provide digital signals representative of said recorded images; and
- an orientation processor, coupled to said scanner to receive said digital signals, said processor being operative to execute the steps of:
    - determining the asymmetric distribution of at least one scene characteristic in said recorded images; and
    - determining the probability of orientation for said set of recorded images as a function of the determined asymmetric distribution of the at least one scene characteristic.

10. An apparatus according to claim 9, wherein said orientation processor is operative to determine asymmetric distribution by determining probability estimates of orientation of each of the individual recorded images, for which the at least one scene characteristic is obtained, as a function of the asymmetric distribution of said at least one scene characteristic in said recorded images.

11. An apparatus according to claim 10, wherein said orientation processor is operative to determine the probability of orientation for said set of recorded images includes in accordance with a Bayesian probability propagation model employing the determined probability estimates of orientation of each of the individual recorded images to produce said probability of orientation for said set of recorded images.

12. An apparatus according to claim 9, wherein said at least one scene characteristic includes color.

13. An apparatus according to claim 9, wherein said at least one scene characteristic includes modulation.

14. An apparatus according to claim 9, wherein said orientation processor is operative to determine said asymmetric distribution by determining the asymmetric distribution of a plurality of scene characteristics.

15. A method according to claim 1, further comprising the steps of:
- (d) ascertaining a probability that a certain type of image recorder was used to create said set of recorded images; and
- (e) utilizing said probability from said ascertaining step in step (c).

* * * * *